Patented June 4, 1940

2,203,628

UNITED STATES PATENT OFFICE 2,203,628

PRODUCTION OF BUTANE-POLYCARBOXYLIC ACIDS

Heinrich Hopff and Wilhelm Rapp, Ludwigshafen-on-the-Rhine, Germany, assignors to I. G. Farbenindustrie Aktiengesellschaft, Frankfort-on-the-Main, Germany No Drawing. Application June 16, 1939, Serial No. 279,486. In Germany July 12, 1938

4 Claims. (Cl. 260—537)

The present invention relates to the production of butane-polycarboxylic acids.

We have found that butane-polycarboxylic acids can be obtained in a simple manner by oxidizing with nitric acid $\Delta^4$-cyclohexenes which are substituted in at least one of the positions 1 and 2 of the hexene nucleus by carboxylic, carboxylic anhydride, cyano or keto groups. Such compounds are obtainable by adding butadiene-(1,3) or other hydrocarbons of the butadiene series on to olefinic compounds the carbon double linkage of which is in alpha-position to at least one carboxyl, cyano or keto group.

As initial materials there may be mentioned addition compounds of butadiene itself with alpha-beta-unsaturated carboxylic acids or their anhydrides, as for example crotonic acid, maleic acid, maleic anhydride, cinnamic acid, or with nitriles of alpha-beta-unsaturated carboxylic acids, as for example acrylic nitrile, cinnamic acid nitrile or maleic acid dinitrile, or with alpha-beta-unsaturated ketones, e. g. vinylalkyl ketones or vinylbenzyl ketone, and also the corresponding addition compounds of other hydrocarbons of the butadiene series, as for example isoprene or cyclohexadiene.

The reaction conditions depend on the strength of the nitric acid used. By working with 40 to 70 per cent nitric acid, it is usually sufficient for the preparation of the polycarboxylic acids to allow the initial materials to stand for some time in the cold or at moderately elevated temperature (from 40° to 70° C.). More dilute nitric acid is used at higher temperatures, often even at temperatures above 100° up to 200° C., and under increased pressure. Nitric acid having a content of less than about 10 per cent is generally speaking unsuitable for the reaction. The duration of the reaction depends on the strength of the nitric acid used. A simple preliminary experiment renders it possible to determine the time after which the reaction must be interrupted in order to avoid undesirable further oxidation of the butane polycarboxylic acids. In order to accelerate the reaction, small amounts of oxidation catalysts, as for example an alkali molybdate or vanadate, may be added.

Depending on the nature of the initial materials, butane polycarboxylic acids are obtained having different numbers of carboxylic acid groups. The addition compound of butadiene and maleic acid anhydride for example, yields a butane tetracarboxylic acid or its anhydride according to the scheme:

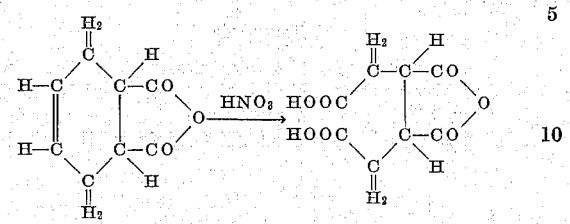

In a corresponding manner there is obtained for example from the addition compound of butadiene and cinnamic acid, 2-phenylbutane-1,3,4-tricarboxylic acid. In many cases there may be formed, in addition to the two carboxylic acid groups formed by rupture of the double linkages and oxidation of the carbon atoms joined by the double linkage, further such groups, as for example by saponification of a cyano group or oxidation of the keto group.

Some of the compounds prepared according to this invention are new compounds and some are substances which have hitherto been accessible only with difficulty. They are valuable intermediate products for example for the preparation of dyestuffs and textile assistants.

The following examples will further illustrate how this invention may be carried out in practice but the invention is not restricted to these examples. The parts are by weight.

Example 1

532 parts of $\Delta^4$-cyclohexene-1,2 dicarboxylic acid anhydride are introduced during the course of 4 hours into 2500 parts of 50 per cent nitric acid to which 1 part of ammonium vanadate has been added, care being taken by cooling that the temperature does not rise above 60° C. When a clear solution has been formed, the whole is stirred for 2 hours at from 50° to 60° C., and then cooled. The majority of the tetracarboxylic acid formed separates out; it is crystallized from water. By boiling with double amount of acetic anhydride there is obtained butane-1,2,3,4-tetracarboxylic acid dianhydride having a melting point of 248° C.

Example 2

202 parts of 2-phenyl-Δ⁴-cyclohexene-1-carboxylic acid (obtained by condensing cinnamic acid with butadiene) are introduced in portions into 540 parts of 50 per cent nitric acid at from 60° to 70° C. while stirring well. When the whole has dissolved, it is stirred at 60° C. for 2 hours. By cooling, a syrupy crystal mass separates. It is purified by recrystallizing 2 or 3 times from water. A good yield of 2-phenylbutane-1,3,4,-tricarboxylic acid, having a melting point of from 199° to 200° C. is thus obtained.

Example 3

248 parts of Δ⁴-cyclohexene-1-methylketone (obtained by condensation of butadiene with vinylmethyl ketone) are allowed to run drop by drop, while stirring, into 1100 parts of 64 per cent nitric acid, care being taken by cooling that the temperature does not rise above 45° C. When the ketone has been added, the reaction mixture is allowed to stand for further two hours. The solution is then evaporated under reduced pressure, the residue carefully mixed with acetone whereby the syrupy mass solidifies to form a crystal-pulp. By recrystallizing it 2 or 3 times from a mixture of equal parts of benzene and acetone there is obtained butane-1,2,4-tricarboxylic acid, having a melting point of from 122° to 124° C.

Example 4

107 parts of Δ⁴-cyclohexene-1-nitrile (obtained by condensation of butadiene with acrylic acid nitrile) are allowed to run drop by drop into 540 parts of 50 per cent nitric acid while stirring and maintaining a temperature of from 50° to 60° C. The mixture is allowed to stand at 50° C. for further two hours. By cooling a syrupy crystal mass separates. It is purified by recrystallization 2 or 3 times from water, yielding a mixture of butane-1,2,4-tricarboxylic acid and 2-cyanbutane-1,4-dicarboxylic acid.

What we claim is:

1. The process for the production of butane polycarboxylic acids which consists in oxidizing with nitric acid a Δ⁴-cyclohexene hydrocarbon which is substituted in at least one of the positions 1 and 2 by a substituent of the group consisting of carboxylic, carboxylic anhydride, cyano and keto groups.

2. The process for the production of butane polycarboxylic acids which consists in oxidizing with nitric acid Δ⁴-cyclohexene which is substituted in at least one of the positions 1 and 2 by a substituent of the group consisting of carboxylic, carboxylic anhydride, cyano and keto groups.

3. The process for the production of butane polycarboxylic acids which consists in oxidizing with aqueous nitric acid of from 40 to 70 per cent strength at temperatures up to 70° C. Δ⁴-cyclohexene which is substituted in at least one of the positions 1 and 2 by a substituent of the group consisting of carboxylic, carboxylic anhydride, cyano and keto groups.

4. The process for the production of butane polycarboxylic acids which consists in oxidizing with aqueous nitric acid of from 40 to 70 per cent strength at temperatures up to 70° C. Δ⁴-cyclohexene-1,4-dicarboxylic acid.

HEINRICH HOPFF.
WILHELM RAPP.